US008670466B1

(12) United States Patent
Sathe et al.

(10) Patent No.: US 8,670,466 B1
(45) Date of Patent: Mar. 11, 2014

(54) SYSTEM AND METHOD FOR RESIDENCE TIME CALCULATION

(75) Inventors: Satish Sathe, San Ramon, CA (US); Sundeep Gupta, Maharashtra (IN)

(73) Assignee: Applied Micro Circuits Corporation, Sunnyvale, CA (US)

( * ) Notice: Subject to any disclaimer, the term of this patent is extended or adjusted under 35 U.S.C. 154(b) by 273 days.

(21) Appl. No.: 12/975,500

(22) Filed: Dec. 22, 2010

(51) Int. Cl.
*H04J 3/06* (2006.01)

(52) U.S. Cl.
USPC ............ 370/509; 370/235; 370/389; 370/503

(58) Field of Classification Search
None
See application file for complete search history.

(56) References Cited

U.S. PATENT DOCUMENTS

| 4,607,257 | A | 8/1986 | Noguchi |
| 5,261,118 | A | 11/1993 | Vanderspool, II |
| 7,103,072 | B1 | 9/2006 | Sloan et al. |
| 2003/0140162 | A1 | 7/2003 | Penet et al. |
| 2004/0258097 | A1* | 12/2004 | Arnold et al. .................. 370/503 |
| 2005/0201399 | A1* | 9/2005 | Woodward et al. ............ 370/412 |
| 2009/0245104 | A1* | 10/2009 | Nishimura et al. ............ 370/230 |
| 2010/0040369 | A1 | 2/2010 | Zhao |
| 2010/0118895 | A1 | 5/2010 | Radulescu |
| 2011/0044264 | A1* | 2/2011 | Chen et al. ..................... 370/329 |
| 2011/0051754 | A1* | 3/2011 | Lansdowne ................... 370/503 |
| 2011/0200051 | A1* | 8/2011 | Rivaud et al. ................. 370/400 |
| 2012/0014377 | A1* | 1/2012 | Joergensen et al. ........... 370/352 |

* cited by examiner

*Primary Examiner* — Donald Mills
(74) *Attorney, Agent, or Firm* — Turocy & Watson, LLP

(57) ABSTRACT

A system and method are provided for residence time calculations in a network communications local device. A network interface module in the local device receives a first packet from a network-connected remote device. A timing module in the local device records an arrival time of the first packet with respect to a local reference clock. The timing module tracks adjustments in the local reference clock and records a known departure time, with respect to the local reference clock, of when the first packet will be transmitted from the network interface. The timing module adds a residence time field to the first packet representing the difference between the arrival and departure times, taking into account adjustments in the local reference clock.

19 Claims, 4 Drawing Sheets

Fig. 2
| SAMPLE ID NUMBER | TIMING ADJUSTMENT | NUMBER OF ARRIVALS ASSOCIATED WITH SAMPLE ID |
|---|---|---|
| 0 | +1 | 0 |
| 1 | +1 | 1 |
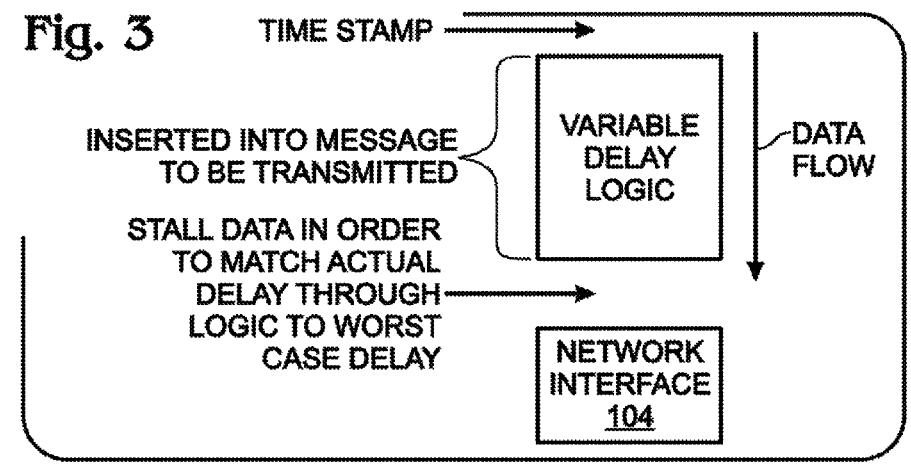
Fig. 3
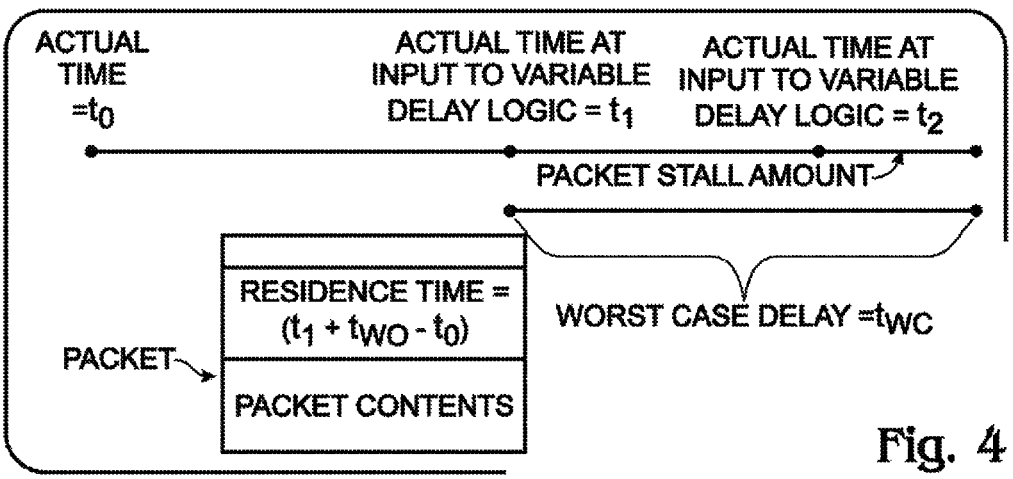
Fig. 4

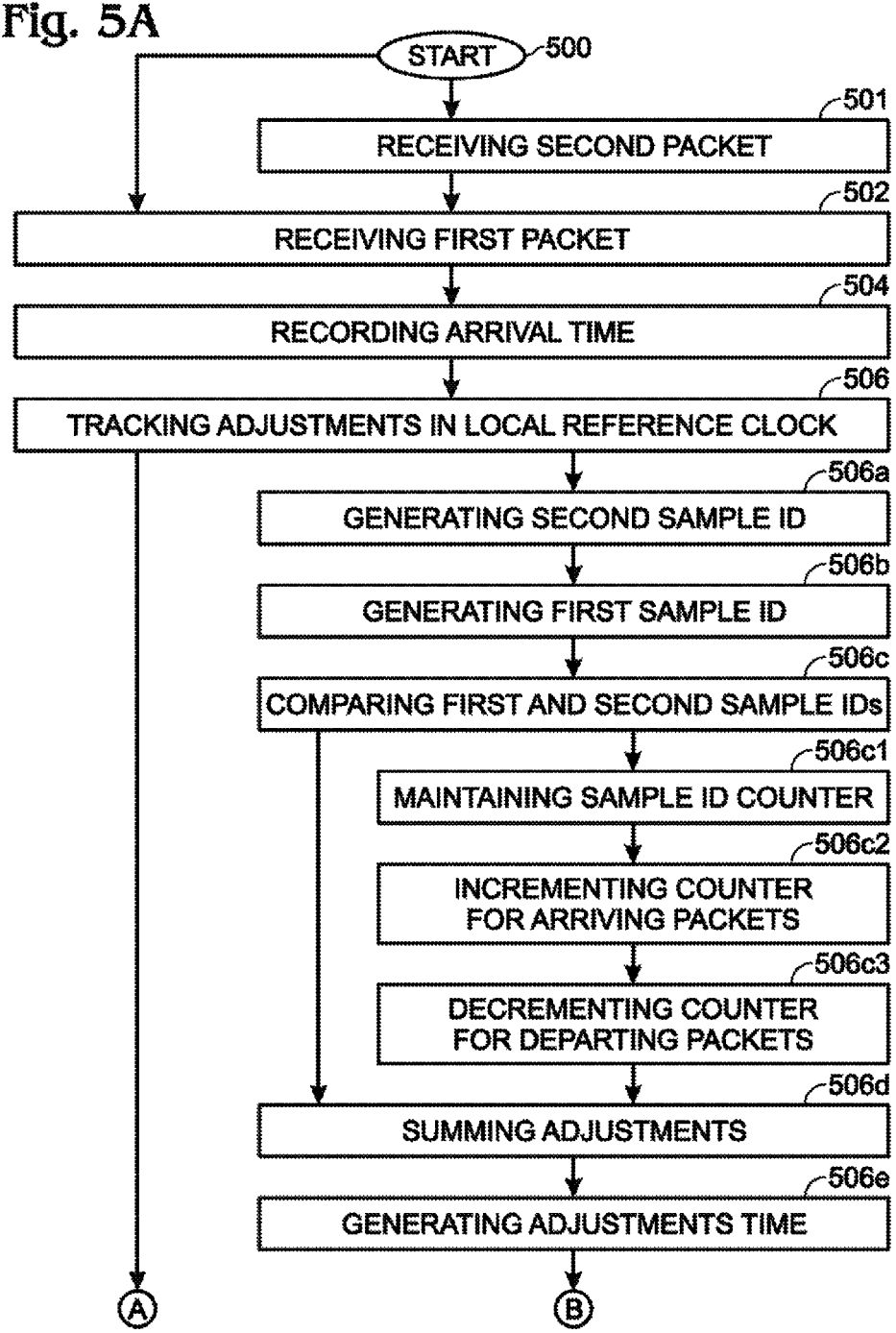

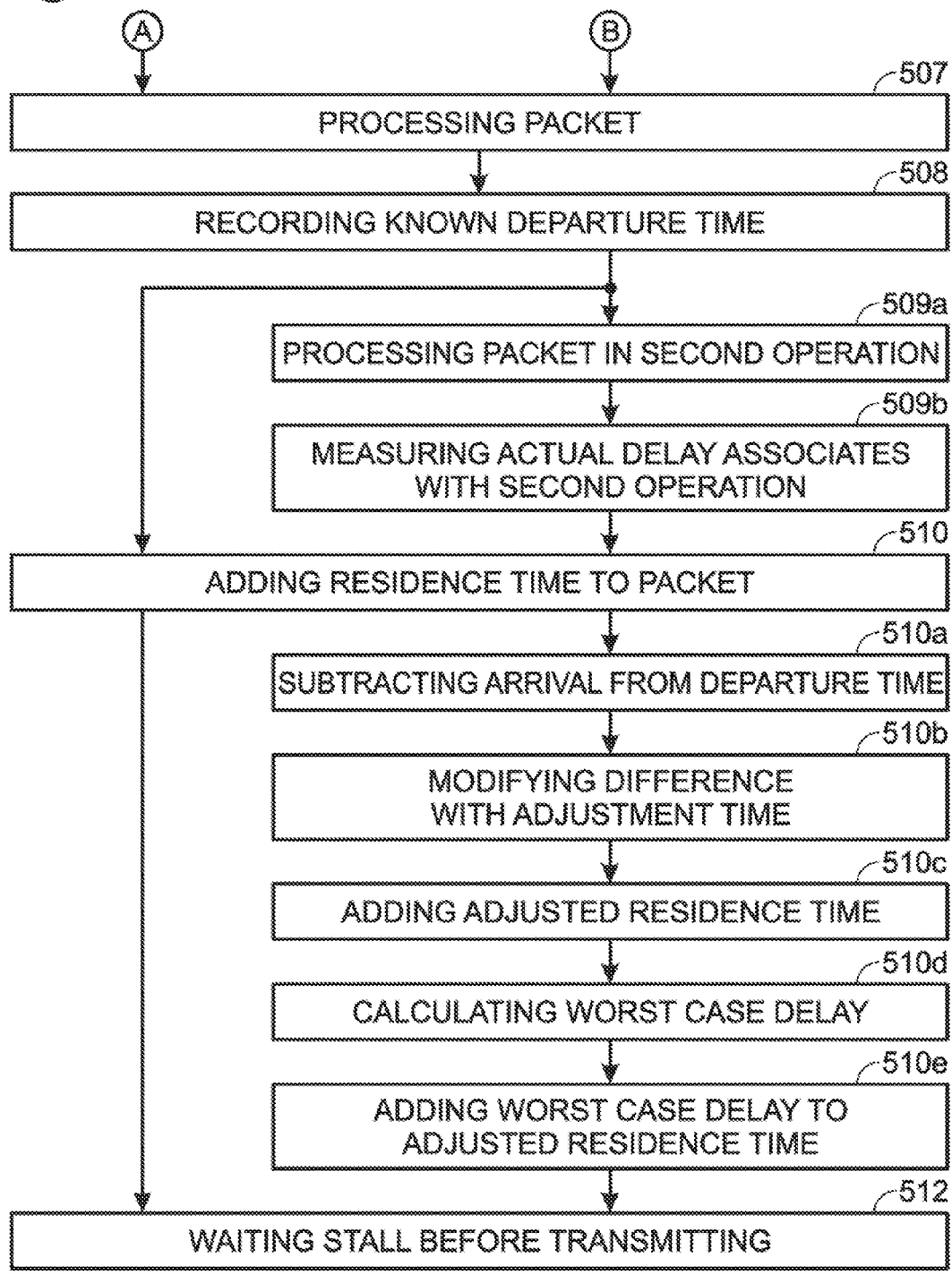

SYSTEM AND METHOD FOR RESIDENCE TIME CALCULATION

BACKGROUND OF THE INVENTION

1. Field of the Invention

This invention generally relates to remote unit time synchronization and, more particularly, to a system and method for improving time calculations under transient time adjustment conditions in devices with variable delays in the pre and post time measurement points.

2. Description of the Related Art

Many network-connected systems include a local device that needs to acquire an accurate time from a remote device, and keep a local copy that is synchronized to the remote device time. Since the connection to the remote device is over a network, and a reading of the remote device's time can only be made from time-to-time instead of continuously, the local device may need to update its local time every time a new time measurement is received from the remote device. Typically, the measurement is received over a network that has a transit time from when the remote device makes the measurement, to when the local device receives the measurement. Thus, a means for determining this transit time is necessary. Usually, this determination is made by having the local device send back a message with the original time measurement, including the amount of time that the message resided within the local device, which is referred to herein as the residence time.

A residence time calculation requires that the local device subtract the time at which a message is received, from the time at which the message is sent. However, if an adjustment is made to the local device clock in time between the time when the message arrived and when the message is sent, then this adjustment creates an error in the measured residence time. That is, the local time reference for the arrival time becomes different than the local time reference for the message departure time, and this change in the local time reference creates an error.

In order to prevent this error, two things can be done. First, make no adjustments to the local time while a message requiring a residence time calculation is pending in the local device. Alternatively, recognize that an adjustment was made and provide a means to compensate for that adjustment. Not making the time adjustment (option 1) delays the local device time adjustments, resulting in less accurate residence time transit time reporting. Option 2 requires that the local device control and keep track of how many outstanding residence time calculations there are at any given time, which adds complication to measurement algorithm.

It would be advantageous if simple, yet accurate residence time calculations could be made for pending messages that takes into account local time adjustments.

SUMMARY OF THE INVENTION

Described herein is a means by which a local device can make adjustments to its local time reference as quickly as possible, without affecting the accuracy of any outstanding residence time measurements that are reported to a network-connected remote device. Additionally, a means is presented by which the variation in residence time can be eliminated, when a variation exists in the signal after the timing measurement point. Such a variation may exist if the time measurement messages being exchanged between the remote and local device are at a higher protocol level, or are encrypted.

The actual message that is exchanged between the remote and local device may be an Ethernet packet, or may be a User Datagram Protocol (UDP) packet, or any other type of packet. In any case, other system requirements may dictate that messages exchanged between the two devices be encrypted using Media Access Control Security (MAC) sec (IEEE 802.1), Internet Protocol Security IPsec, or Datagram Transport Layer Security (DTLS). It is also possible that the hardware may be performing UDP/IP version 4 (IPv4) header checksums on the packet. In all of these cases, the time that the message leaves the device must be calculated before the encryption or checksum calculation is done, and these processes may take a varying amount of time to complete. This variance in time results in an uncertainty in the residence time calculation that directly affects the accuracy that can be achieved in the system. Also disclosed herein is a means that uses a time adjustment technique to compensate for this variance, so that it does not contribute any inaccuracy to the residence time calculation.

Accordingly, a method is provided for residence time calculations in a network communications local device. A network interface module in the local device receives a first packet from a network-connected remote device. A timing module in the local device records an arrival time of the first packet with respect to a local reference clock. The timing module tracks adjustments in the local reference clock and records a known departure time, with respect to the local reference clock, of when the first packet will be transmitted from the network interface. The timing module adds a residence time field to the first packet representing the difference between the arrival and departure times, taking into account adjustments in the local reference clock.

The arrival time is recorded by associating a sample identification (ID) number with each received packet. The timing module tracks adjustments in the local reference clock by accessing a tracking table cross-referencing adjustments in the local reference clock with sample ID numbers.

For example, prior to receiving the first packet, the local device may receive an initial packet with an initial adjustment to the local reference clock, and the first packet may be received with a subsequent adjustment to the local reference clock. The timing module tracks adjustments in the local reference clock by generating a first sample ID number associated with the first packet and generating a second sample ID number with the initial packet. After comparing the first sample ID number to the second sample ID number, any adjustments to the local reference clock, made between a first period of time associated with the first sample ID number and a second period of time associated with the second sample ID number, are summed, and an adjustment time is generated. The residence time field is added to the first packet by subtracting the arrival time from the departure time, creating a difference. The difference is modified with the adjustment time, creating an adjusted residence time, and the adjusted residence time is added to the residence time field.

Additional details of the above-described method, and a system for residence time calculations in a network communications local device, are provided below.

BRIEF DESCRIPTION OF THE DRAWINGS

FIG. 2 is a diagram illustrating a tracking table with associated sample IDs.

FIG. 3 is a diagram illustrating the timing relationship between residence time and post-timestamp variable delays.

FIG. 4 is a timing diagram illustrating the use of stall time to compensate for worst case variable delays.

FIGS. 5A and 5B are flowcharts illustrating a method for residence time calculations in a network communications local device.

DETAILED DESCRIPTION

Figure 1:
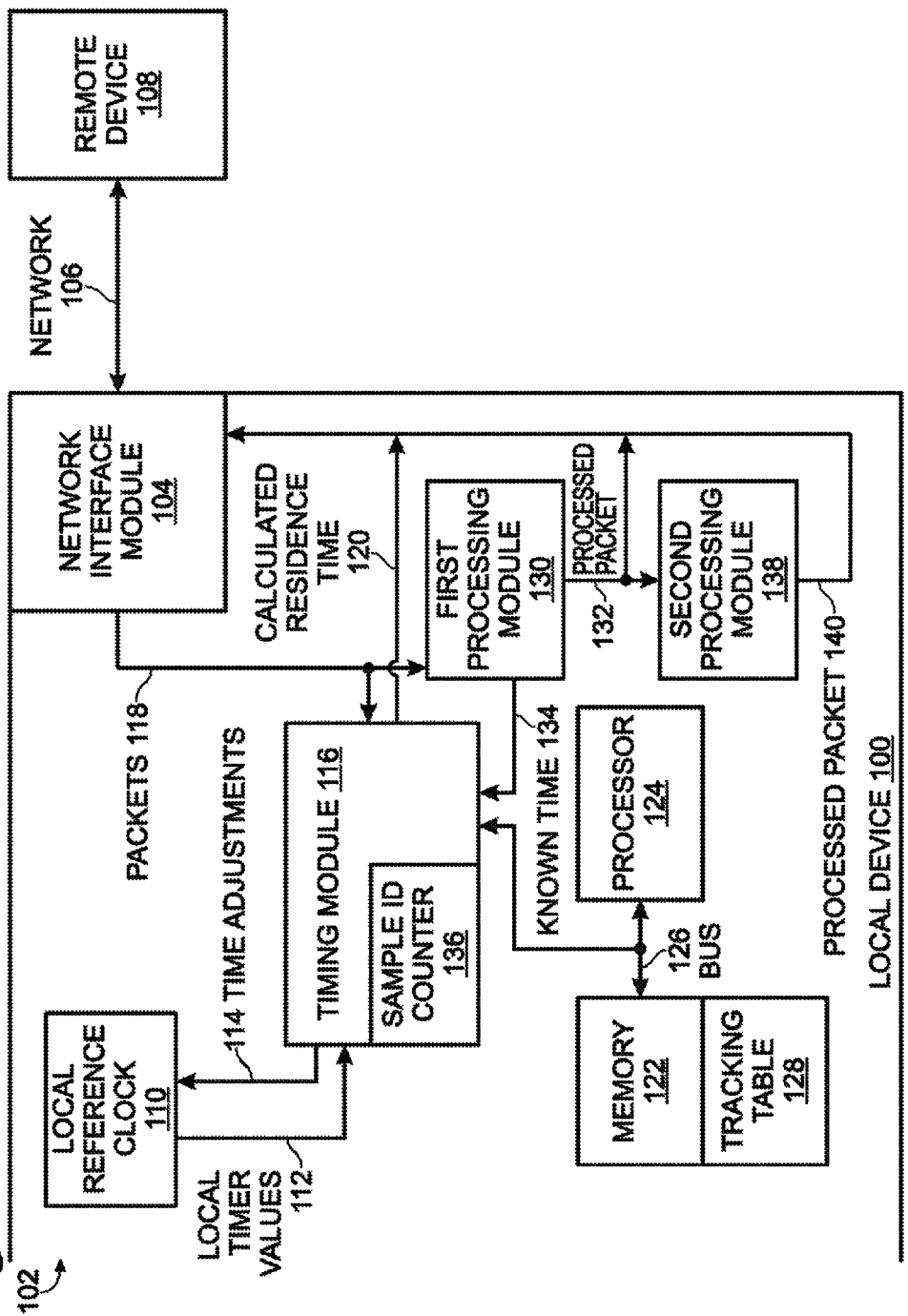
FIG. 1 is a schematic block diagram of a network communications local device with a system for residence time calculations.

FIG. 1 is a schematic block diagram of a network communications local device 100 with a system for residence time calculations. The system 102 comprises a network interface module 104 having an input on line 106 to receive a first packet from a network-connected remote device 108. The network interface module 104 may be a modem, an Ethernet card, or any other appropriate data communications device. The network interface module 104 may be more than one interface. The physical communication link 106 may be optical, wired, or wireless.

A local reference clock 110 has an output on line 112 to supply local time values and an input on line 114 to receive local time adjustments. A timing module 116 has an input on line 112 to accept the local time values and an input on line 118 to accept the first packet. The timing module 116 records the arrival time of the first packet with respect to the local reference clock 110, records a known departure time when the first packet will be transmitted, and supplies a calculated residence field at an output on line 120, representing the difference between the arrival and departure times of the first packet, taking into account any adjustments in the local reference clock 110. The network interface module 104 has an output on line 106 to transmit the first packet with the residence field to the remote device 108.

The timing module may be enabled as a software application of sequential instructions stored in the memory 122 and executed by the processor 124. Alternately, as shown, the timing module 116 is completely or partially enabled in hardware as a state machine type logic module (e.g., a field programmable gate array (FPGA)).

If components of the local device are enabled as software, the local device may be considered to be a computer system with a bus or other communication mechanism for communicating information, with the processor 124 coupled to a bus 126 for processing information. The computer system memory 122 may be a medium main memory, such as a random access memory (RAM) or other dynamic storage device, coupled to the bus 126 for storing information and instructions to be executed by processor 124. These memories may also be referred to as a computer-readable medium. As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The memory 122 includes a tracking table 128 cross-referencing adjustments in the local reference clock 110 with sample identification (ID) numbers. The timing module 116 associates a sample ID number with each received packet. For example, the network interface module 104 may receive the first packet with a subsequent adjustment in the local reference clock, subsequent to receiving a second packet with an initial adjustment in the local reference clock. Then, the timing module 116 generates a first sample ID number associated with the first packet, and generates a second sample ID number associated with the second packet.

Continuing the example, the timing module 116 compares the first sample ID number to the second sample ID number, and sums the adjustments to the local reference clock between a first period of time associated with the first sample ID number and a second period of time associated with the second sample ID number. The timing module 116 further generates an adjustment time, subtracts the arrival time from the departure time, creating a difference. The difference is modified with the adjustment time, creating an adjusted residence time, and the adjusted residence time is added to the residence time field. An alternative explanation of this example supports FIG. 2, below.

In one aspect, a first processing module 130 has an input on line 118 to accept the first packet, an output on line 132 to supply the first packet processed in a first operation, and an output on line 134 to supply a known variable time associated with first operation processing. Alternatively, the processing time is a fixed number, and it is not necessary to send the known variable timing on line 134. The timing module 116 has an input on line 134 to accept the time associated with the first operation processing, which is the residence time. The first processing module may be enabled as a sequence of software instructions stored in memory and executed by the processor, in which case, the timing module and first processing module may be co-located applications. Alternatively, as shown, the first processing module 130 is enabled in hardware.

The timing module 116 maintains a sample ID counter 136 that is incremented in response to accepting a packet associated with the first sample ID number, and decremented in response to recording a departure time of a packet associated with the first sample ID number. The timing module 116 sums adjustments to the local reference clock 110 after each adjustment, cross-references the summed changes to associated sample ID numbers, and adds the summed changes to the tracking table 128. Alternatively, the sample ID counter is enabled in memory 122. As another alternative, the sample ID counter and tracking table may be merged, see FIG. 2.

In one aspect, the system 102 further comprises a second processing module 138 having an input on line 132 to accept the first packet, and an output on line 140 to supply the first packet processed in a second operation, where the time associated with second operation processing is an unknown variable value delay. For example, the second processing module 138 may perform an operation such as encrypting the first packet or adding a checksum to the first packet. In this case, the timing module 116 calculates a worst case second operation delay value, and adds the worst case second operation delay value to the adjusted residence time. The second processing module may be enabled as a sequence of software instructions stored in memory and executed by the processor, in which case, the timing module and second processing module may be co-located applications. Alternatively, as shown, the second processing module 138 is enabled in hardware.

In another aspect, the timing module 116 measures an actual second operation delay value, subtracts the actual second operation delay value from the worst case second operation delay value, creating a stall time value, and sends to stall value to the network interface module 104 on line 120. The network interface module 104 waits the stall time value before transmitting the first packet with the adjusted residence time field.

Functional Description

One aspect of the system described above implements a sample identifier (ID) that is maintained with every captured time value within the system. This sample ID is incremented every time the local time is adjusted. A table 128 is maintained with the sample IDs that indicates the amount of adjustment made to the local time. Whenever a message is received and the arrival time is recorded, a sample ID is also captured. Whenever a message is transmitted and the departure time is read in order to calculate the residence time, the sample ID associated with the departure time is compared with the sample ID associated with the arrival time. If both the sample IDs are identical, then no time adjustments were made from the time that the message arrived to the time it is departing, and hence no correction is needed. If the sample ID of the departure time is not the same as the sample ID of the arrival time, then the table that tracks local clock adjustments is read in order to determine the correction amount. This value is then used to correct for the effects of the local time adjustment.

FIG. 2 is a diagram illustrating a tracking table 128 with associated sample IDs. Consider an example where a message arrives at time 10 with sample ID 0. At a later time, this message captures a departure time of 20 with sample ID 0. In this case, since the sample IDs are identical, the residence time is calculated as 20−10=10.

Consider a second example where a message arrives at time 10 with sample ID 0. An adjustment was then made to the local time at time 12. This adjustment changes the local time from 12 to 13, and the sample ID is incremented to 1. Additionally, the sample ID adjustment table for sample ID 1 indicates that the local time was incremented by 1. If the residence time of this message is exactly the same as the residence time of the message from the first example, then the residence time should also be the same, namely 10. However, unless otherwise corrected, the departure time in this example would be captured as 21. That is, if a sample ID adjustment is not made, the residence time would be incorrectly calculated as 21−10=11. However, since the sample ID of the departure time is captured as 1, the associated time adjustment table can be read. This table indicates that an adjustment is made to increment the local time by 1, and the residence time calculated should decremented by this correction. Therefore, the adjusted residence time is calculated as 21−10−1=10, which is the correct residence time.

The number of sample IDs used can be adjusted based on the anticipated worst case residence time and the anticipated time between successive time adjustments, in order to minimize hardware while reducing the likelihood of sample ID wraparound. Since a device cannot have an unlimited number of sample IDs, the situation must be addressed for when the number of adjustments to the local time are so frequent that the number of sample IDs can overflow. This can happen if the number of adjustments received is large, or the residence time of a message is long. In order to handle this situation, a counter per sample ID can be maintained that counts the number of messages that reside in the device. This number can be easily calculated by incrementing the counter whenever a message uses that sample ID for its arrival time, and decrementing the counter whenever a message using that sample ID is transmitted or dropped.

The device can now check if any messages associated with a particular sample ID still reside in the device by checking the counter value, and can hold off making an update if the counter is non-zero. The number of sample IDs used and the size of the counter can be determined by estimating the expected residence time within the device and the expected rate of time adjustments. In this manner, the device can minimize the number of time adjustments to be held off, while maintaining a reliable and error free mechanism to detect the event if it occurs.

FIG. 3 is a diagram illustrating the timing relationship between residence time and post-timestamp variable delays. Another aspect of the system deals with adjusting for the variance in residence time that may be introduced due to other network functions such as checksum calculation or encryption. These functions may introduce variable delays in the residence time in the event that packet sizes are different, if the hardware is shared and arbitrated between multiple network interfaces, or if the parameters required to carry out the operation may sometimes be located in low latency RAMs and at other times may be located in longer latency RAMs. For example, a security parameter necessary for encrypting the outgoing packet may be located in an on-chip memory for some packets, and may be located off-chip for other packets.

Similarly, if the hardware encryption engine is shared between multiple network interfaces, then there may be variance in the residence time depending on whether the other interfaces have packets being processed at the same time. The problem is that the residence time needs to be inserted into the outgoing frame before the checksum calculation or encryption process is performed in order to maintain proper network processing order.

In order to compensate for this variance, the system calculates the worst case delay experienced through all the processing that is performed from the time (location in process flow) at which the departure time is measured to the time (location in process flow) at which the processing is no longer variable. Every packet that requires a time calculation is tagged with the time at which it arrives at the input of the variable delay logic. The actual value used for the departure time is calculated as this tagged time, plus the worst case delay. At the output of the variable delay logic, the actual time delay that the packet experiences in the variable delay logic is compared to the worst case delay, and the packet is stalled until both times are equal. The actual time delay measurement need not be measured at the network interface, but the variable time measurement must be made between two points that envelop all the variable time components. For example, if the PHY device always has the exact same delay for all packets, it is not necessary to measure that delay, since it is not variable.

FIG. 4 is a timing diagram illustrating the use of stall time to compensate for worst case variable delays. In this example, the packet had an arrival time of $t_0$. Its residence time is inserted into the packet as $t_1 + t_{wc} - t_0$. The packet experiences a delay of $t_2 - t_1$ in the variable delay logic. The packet is thus stalled for an additional time until the actual delay experienced by that packet equals $t_{wc}$. Since time measurement packets are infrequent in terms of overall bandwidth of the network interface, stalling these packets does not affect network performance measurably and leads to an accurate residence time calculation regardless of the actual delay experienced in the variable delay logic.

FIGS. 5A and 5B are flowcharts illustrating a method for residence time calculations in a network communications local device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

In Step 502 a network interface module receives a first packet from a network-connected remote device. In Step 504 a timing module records an arrival time of the first packet with respect to a local reference clock. In Step 506 the timing module tracks adjustments in the local reference clock. Subsequent to receiving the first packet and prior to recording the departure time, Step 507 processes the first packet in a first operation, where the time associated with first operation processing is a known variable value equal to the residence time. In Step 508 the timing module records the known departure time, with respect to the local reference clock, of when the first packet will be transmitted from the network interface. As explained in more detail below, the departure time is "known" with respect to the processing time associated with Step 507, but may not take into account subsequent processes with variable (unknown) time delays. In Step 510 the timing module adds a residence time field to the first packet representing the difference between the arrival and departure times, taking into account adjustments in the local reference clock.

In one aspect, recording the arrival time in Step 504 includes associating a sample identification (ID) number with each received packet, and tracking adjustments in the local reference clock (Step 506) includes the timing module accessing a tracking table cross-referencing adjustments in the local reference clock with sample ID numbers.

For example, Step 501 may receive a second packet with an initial adjustment to the local reference clock, prior to receiving the first packet, and Step 502 receives the first packet with a subsequent adjustment to the local reference clock. Then, tracking adjustments the local reference clock (Step 506) includes the following substeps. In Step 506a the timing module generates a second sample ID number associated with the second packet. Step 506b generates a first sample ID number associated with the first packet. However, it should be noted that the local reference clock can be adjusted based upon other events, and these adjustments are also maintained in the tracking table.

Step 506c compares the first sample ID number to the second sample ID number. Step 506d sums the adjustments to the local reference clock between a first period of time associated with the first sample ID number and a second period of time associated with the second sample ID number, and Step 506e generates an adjustment time.

Then, adding the residence time field to the first packet in Step 510 includes the following substeps. Step 510a subtracts the arrival time from the departure time, creating a difference. Step 510b modifies the difference with the adjustment time, creating an adjusted residence time. Step 510c adds the adjusted residence time to the residence time field.

In one aspect, comparing the first sample ID number to the second sample ID number in Step 506c includes additional substeps. In Step 506c1 the timing module maintains a sample ID counter. Step 506c2 increments the counter in response to accepting a packet associated with the first sample ID number. Step 506c3 decrements the counter in response to recording a departure time of a packet associated with the first sample ID number.

In another aspect, generating the adjustment time in Step 506e includes the timing module summing adjustments in the local reference clock after each adjustment, cross-referencing the summed changes to associated sample ID numbers, and adding the summed changes to the tracking table.

In one variation, subsequent to recording the departure time in Step 508, Step 509a processes the first packet in a second operation, where the time associated with second operation processing is an unknown variable value delay. For example, the second processing operation may include encrypting the first packet or adding a checksum to the first packet. Then, adding the residence time field to the first packet in Step 510 includes the following substeps. Step 510d calculates a worst case second operation delay value. Step 510e adds the worst case second operation delay value to the adjusted residence time.

In Step 509b the timing module measures an actual second operation delay value. In Step 509c the timing module subtracts the actual second operation delay value from the worst case second operation delay value, creating a stall time value. In Step 512 the network interface module waits the stall time value before transmitting the first packet with the adjusted residence time field.

A system and method have been provided for network-connected local device residence time calculations. Examples of particular hardware units and process flows have been presented to illustrate the invention. However, the invention is not limited to merely these examples. The invention can be implemented in a system-on-chip (SoC) or any networking device that implement timing synchronization. Other variations and embodiments of the invention will occur to those skilled in the art.

We claim:

1. In a network communications local device, a method for residence time calculations, the method comprising:
   recording an arrival time of a first packet with respect to a local reference clock;
   tracking adjustments in the local reference clock comprising comparing a first sample identification (ID) number associated with the first packet to a second sample ID number associated with a second packet based at least in part by maintaining a counter and incrementing the counter in response to accepting the first packet associated with the first sample ID number;
   recording a departure time of the first packet with respect to the local reference clock and decrementing the counter in response to recording the departure time of the first packet associated with the first sample ID number; and,
   adding a residence time field to the first packet representing a difference between the arrival time and the departure time based at least in part on the adjustments in the local reference clock.

2. The method of claim 1 wherein tracking the adjustments in the local reference clock comprises accessing a tracking table cross-referencing adjustments in the local reference clock with sample ID Nos.

3. The method of claim 2 wherein receiving the first packet comprises receiving the first packet with a subsequent adjustment to the local reference clock;
   the method further comprising:
   prior to receiving the first packet, receiving the second packet with an initial adjustment to the local reference clock.

4. The method of claim 3 wherein tracking the adjustments in the local reference clock comprises:
   summing the adjustments to the local reference clock between a first period of time associated with the first sample ID number and a second period, of time associated with the second sample ID number;
   generating an adjustment time;

wherein adding the residence time field to the first packet comprises:
  subtracting the arrival time from the departure time, creating a difference;
  modifying the difference with the adjustment time, creating an adjusted residence time; and,
  adding the adjusted residence time to the residence time field.

5. The method of claim 1 further comprising:
subsequent to receiving the first packet and prior to recording the departure time, processing the first packet in a first operation, where a time value associated with the first operation processing is a known variable value equal to the residence time.

6. The method of claim 4 wherein generating the adjustment time comprises summing adjustments in the local reference clock after each adjustment, cross-referencing the summed changes to associated sample ID numbers, and adding the summed changes to the tracking table.

7. The method of claim 4 further comprising:
subsequent to recording the departure time, processing the first packet in a second operation, where a time value associated with second operation processing is an unknown variable value delay;
wherein adding the residence time field to the first packet comprises:
  calculating a worst case second operation delay value; and,
  adding the worst case second operation delay value to the adjusted residence time.

8. The method of claim 7 further comprising:
measuring an actual second operation delay value;
subtracting the actual second operation delay value from the worst case second operation delay value, creating a stall time value; and,
waiting the stall time value before transmitting the first packet with the adjusted residence time field.

9. The method of claim 7 wherein processing the first packet in the second processing operation comprises performing an operation selected from a group consisting of encrypting the first packet and adding a checksum to the first packet.

10. In a network communications local device, a system for residence time calculations, the system comprising:
  a network interface module configured to receive a first packet from a network-connected remote device;
  a timing module configured to record an arrival time of the first packet with respect to a local reference clock, track adjustments in the local reference clock based at least in part on a comparison between a first sample identification (ID) number associated with the first packet and a second sample ID number associated with a second packet, record a departure time of the first packet, and supply a calculated residence field, representing a difference between the arrival time and the departure time of the first packet, based at least in part on the adjustments in the local reference clock, wherein the timing module maintains a counter that is incremented in response to accepting the first packet associated with the first sample ID number and is decremented in response to recording the departure time of the first packet associated with the first sample ID number; and,
  wherein the network interface module is configured to transmit the first packet with the residence field to the network-connected remote device.

11. The system of claim 10 further comprising:
  a memory comprising a tracking table cross-referencing adjustments in the local reference clock with sample ID numbers; and,
  wherein the timing module associates a sample ID number with each received packet.

12. The system of claim 11 wherein the network interface module receives the first packet with a subsequent adjustment in the local reference clock, subsequent to receiving the second packet with an initial adjustment in the local reference clock.

13. The system of claim 12 wherein the timing module sums the adjustments to the local reference clock between a first period of time associated with the first sample ID number and a second period of time associated with the second sample ID number, generates an adjustment time, subtracts the arrival time from the departure time, creating a difference, modifies the difference with the adjustment time, creating an adjusted residence time, and adds the adjusted residence time to the residence time field.

14. The system of claim 13 further comprising:
  a first processing module configured to accept the first packet, supply the first packet processed in a first operation, and supply a known variable time associated with the first operation processing; and,
  wherein the timing module is configured to accept the known variable time associated with the first operation processing, wherein the known variable time is equal to the residence time.

15. The system of claim 13 wherein the timing module sums adjustments to the local reference clock after each adjustment, cross-references the summed changes to associated sample ID numbers, and adds the summed changes to the tracking table.

16. The system of claim 13 further comprising:
  a second processing module configured to accept the first packet and supply the first packet processed in a second operation, where a time value associated with the second operation processing is an unknown variable value delay; and,
  wherein the timing module calculates a worst case second operation delay value, and adds the worst case second operation delay value to the adjusted residence time.

17. The system of claim 16 wherein the timing module measures an actual second operation delay value, subtracts the actual second operation delay value from the worst case second operation delay value, creating a stall time value, and sends to stall value to the network interface module; and,
  wherein the network interface module waits the stall time value before transmitting the first packet with the adjusted residence time field.

18. The system of claim 16 wherein the second processing module performs an operation selected from a group consisting of encrypting the first packet and adding a checksum to the first packet.

19. In a network communications local device, a system for residence time calculations, the system comprising:
  a means for receiving a first packet from a network-connected remote device;
  a means for recording an arrival time of the first packet with respect to a local reference clock;
  a means for tracking adjustments in the local reference clock comprising comparing a first sample identification (ID) number associated with the first packet to a second sample ID number associated with a second packet based at least in part by maintaining a counter and incrementing the counter in response to accepting the first packet associated with the first sample ID number;

a means for recording a departure time of the first packet and decrementing the counter in response to recording the departure time of the first packet associated with the first sample ID number; and a means for supplying a calculated residence field, representing a difference between the arrival time and the departure time of the first packet, based at least in part on the adjustments to the local reference clock.

* * * * *